United States Patent
Lo (10) Patent No.: US 9,740,277 B2
(45) Date of Patent: Aug. 22, 2017

(54) SYSTEM FOR IDENTIFYING PAIRED ID CARDS

(71) Applicant: Generalplus Technology Inc., Hsinchu (TW)

(72) Inventor: Li Sheng Lo, Zhubei (TW)

(73) Assignee: Generalplus Technology Inc., Hsinchu (TW)

( * ) Notice: Subject to any disclaimer, the term of this patent is extended or adjusted under 35 U.S.C. 154(b) by 33 days.

(21) Appl. No.: 14/844,766

(22) Filed: Sep. 3, 2015

(65) Prior Publication Data

US 2015/0379316 A1    Dec. 31, 2015

Related U.S. Application Data

(63) Continuation-in-part of application No. 14/454,195, filed on Aug. 7, 2014, now Pat. No. 9,367,715.

(30) Foreign Application Priority Data

Apr. 18, 2014  (TW) .............................. 103114257 A
Mar. 23, 2015  (TW) .............................. 104109138 A (51) Int. Cl.
*G06K 7/08*    (2006.01)
*G06K 19/077*  (2006.01)
(Continued)

(52) U.S. Cl.
CPC ................. *G06F 3/00* (2013.01); *G06K 7/08* (2013.01); *G06K 19/067* (2013.01)

(58) Field of Classification Search
CPC ............... G06K 7/08; G06K 19/07745; G06K 19/07749
(Continued)

(56) References Cited

U.S. PATENT DOCUMENTS 4,553,026 A  *  11/1985  Arlowe ................. G06K 7/081
                                                            235/451
5,949,060 A  *   9/1999  Schattschneider ... G06K 19/067
                                                            235/382
(Continued)

FOREIGN PATENT DOCUMENTS

EP        2418607 A1     2/2012

*Primary Examiner* — Toan Ly
(74) *Attorney, Agent, or Firm* — Muncy, Geissler, Olds & Lowe, P.C.

(57) ABSTRACT

A system for identifying ID (identity) and an ID card using the same are provided in the present invention. The ID card includes a card case, a first conducting electrode and a plurality of second conducting electrodes. The first conducting electrode and the second conducting electrodes are disposed in the card case. At least a specific second conducting electrode is electrically connected to the first conducting electrode to represent a specific ID. A card reader for reading the ID card includes a transmitting unit, a plurality of receiving units and a control circuit. The transmitting unit is disposed at the position corresponding to the first conducting electrode, and the receiving units are disposed at the position corresponding to the second conducting electrodes when the ID card is disposed on the card reader. The control circuit is coupled to the transmitting unit and the receiving units. When the ID card is close to the card reader, the transmitting unit transmits a wireless signal. The control circuit determines the ID of the ID card according to the receiving unit(s) which receive(s) the wireless signal.

9 Claims, 11 Drawing Sheets (51) Int. Cl.
*G06F 3/00* (2006.01)
*G06K 19/067* (2006.01)

(58) Field of Classification Search
USPC .......................................... 235/451
See application file for complete search history.

(56) References Cited

U.S. PATENT DOCUMENTS

2004/0214642 A1* 10/2004 Beck ................... A63F 13/327
463/40
2014/0333025 A1* 11/2014 Amireh .................. A63F 1/02
273/293

* cited by examiner

SYSTEM FOR IDENTIFYING PAIRED ID CARDS

This application is a Continuation-in-Part of co-pending application Ser. No. 14/454,195, filed on 7 Aug. 2014, and for which priority is claimed under 35 U.S.C. §120; and this application claims priority of application Ser. No. 104109138 filed in Taiwan, R.O.C. on 23 Mar. 2015 and Application No. 103114257 filed in Taiwan, R.O.C. on 18 Apr. 2014 under 35 U.S.C. §119; the entire contents of all of which are hereby incorporated by reference.

BACKGROUND OF THE INVENTION

Field of the Invention

The present invention relates in general to a non-contact ID (identity) recognition technology, and more particularly to a system for identifying ID and an ID card using the same.

Related Art

With the progress of the technology and the development of the electrical identity, identity recognition systems are configured in a part of the public institutions, offices, laboratories, elevators, cars and so on, based on the confidentiality and the security reasons. The identity recognition system is used for detecting the ID card such that the person who has the correct ID card can enter. In addition, many shopping centers, playgrounds or public places may have arcade game machines, which kids are favorite game. The arcade game machines need its specific ID card to play. The ID card should be inserted to the arcade game machines to wait the machine to identify, and then the game machine would determine its combat capability, and then the game player can play the game by the ID card.

In present, the most identifications of identity adopt RFID (Radio Frequency Identification) or magnetic stripe. RFID uses radio wave to transmit the tag in the card to perform data transmission and identification. Since the RFID card is implemented by at least a winding and an IC with arithmetic function, the RFID card has higher production cost. The magnetic stripe ID card uses the magnetic strip to store information. The magnetic stripe of the ID card need to physically contact with the magnetic head of the ID card reader. The magnetic stripe should slide through the ID card reader to identify the ID. Since the card reader for magnetic stripe ID card utilizes swiping the ID card by user for data reading, the card reader has to have the magnetic head and its corresponding mechanism, such that the cost of the card reader is excessively high. And, when the magnetic stripe of the ID card is used for a while, the magnetic stripe may be degaussed.

SUMMARY OF THE INVENTION

It is therefore an objective of the present invention to provide an ID card, wherein the ID of the ID card is represented by the electrical connection of a plurality of conductors such that the cost of the ID card can be affectively reduced.

Another objective of the present invention is to provide a system for identifying ID, wherein to sense the electrical connection between the plurality of conductors to determine the ID of the ID card.

In view of this, the present invention provides an ID card, identifying by a card reader, wherein the card reader includes a card placement position, a transmission unit, a plurality of receiving units and a control circuit. The transmission unit is for outputting a transmission signal. The receiving units is for receiving the transmission signal. The control circuit is coupled to the transmission unit and the plurality of receiving units, for controlling the transmission unit to output the transmission signal and determining an ID code according to receiving unit(s) which receives the transmission signal. The ID card includes a card case, a first conducting electrode and at least a second conducting electrode. The first conducting electrode is disposed in the card case, wherein the first conducting electrode is disposed on a position corresponding to the transmission unit when the ID card is disposed on the card placement position of the card reader. The second conducting electrode(s) is/are disposed in the card case, wherein at least a second conducting electrode is electrically connected to the first conducting electrode to represent a specific ID, wherein The second conducting electrode(s) is/are disposed on a position corresponding to one of the receiving units when the ID card is disposed on the card placement position of the card reader. The transmission unit transmits the transmission signal when the ID card is close to the card reader, and the control circuit determines a specific ID code of the ID card according to receiving unit(s) which receives the transmission signal.

The present invention further provides a system for identifying ID. The system includes a card reader and at least an ID card. The card reader is for identifying an ID, wherein the card reader includes a card placement position, a transmission unit, a plurality of receiving units and a control circuit. The transmission unit is for outputting a transmission signal. The receiving units is for receiving the transmission signal. The control circuit is coupled to the transmission unit and the plurality of receiving units, for controlling the transmission unit to output the transmission signal and determining an ID code according to receiving unit(s) which receives the transmission signal. Each ID card includes a card case, a first conducting electrode and at least a second conducting electrode. The first conducting electrode is disposed in the card case, wherein the first conducting electrode is disposed on a position corresponding to the transmission unit when the ID card is disposed on the card placement position of the card reader. The second conducting electrode(s) is/are disposed in the card case, wherein at least a second conducting electrode is electrically connected to the first conducting electrode to represent a specific ID, wherein The second conducting electrode(s) is/are disposed on a position corresponding to one of the receiving units when the ID card is disposed on the card placement position of the card reader. The transmission unit transmits the transmission signal when the ID card is close to the card reader, and the control circuit determines a specific ID code of the ID card according to receiving unit(s) which receives the transmission signal.

The present invention further provides a system for identifying ID. The system includes a card reader and at least an ID card. The card reader is for identifying an ID, wherein the card reader includes a card placement position, a transmission unit, a plurality of receiving units and a control circuit. The transmission unit is for outputting a transmission signal. The receiving units is for receiving the transmission signal. The control circuit is coupled to the transmission unit and the plurality of receiving units, for controlling the transmission unit to output the transmission signal and determining an ID code according to receiving unit(s) which receives the transmission signal. Each ID card includes a card case, a first conducting electrode and a plurality of electrode fixed positions. The first conducting electrode is disposed in the card case, wherein the first conducting electrode is disposed on a position corresponding to the transmission unit when the ID card is disposed on the card placement position of the card reader. The electrode fixed positions are disposed in the card case, for disposing at least a second conducting electrode, wherein at least a specific second conducting electrode is electrically connected to the first conducting electrode to represent a specific ID, wherein the plurality of electrode fixed positions are disposed on the positions corresponding to the receiving units when the ID card is disposed on the card placement position of the card reader. The transmission unit transmits the transmission signal when the ID card is close to the card reader, and the control circuit determines a specific ID code of the ID card according to receiving unit(s) which receives the transmission signal.

In the ID card and the system in accordance with a preferred embodiment of the present invention, the ID card is a master ID card, and the first conducting electrode is disposed on a first side of the card case, and the second conducting electrode(s) is/are disposed on the first side of the card case. Also, the card reader is further used for identifying a slave ID card. And the card reader further includes a second transmission unit and a plurality of second receiving units. The second transmission unit is coupled to the control circuit, for outputting a second transmission signal. The plurality of second receiving units is coupled to the control circuit, for receiving the second transmission signal. The slave ID card includes a second card case, a third conducting electrode and at least a fourth conducting electrode. The third conducting electrode is disposed in the second card case and disposed to the second side of the second card case, wherein the third conducting electrode is disposed on a position corresponding to the second transmission unit when the slave ID card is disposed on the card placement position. The fourth conducting electrode(s) is/are disposed in the second card case and disposed to the second side of the second card case, wherein at least a fourth conducting electrode is electrically connected to the third conducting electrode to represent a specific slave ID, wherein at least a fourth conducting electrode is disposed on a position corresponding to one of the receiving units when the ID card is placed on the card placement position of the card reader.

In the ID card and the system in accordance with a preferred embodiment of the present invention, the ID card is a circle ID card, and the first conducting electrode is disposed to a center of the ID card, wherein the transmission unit is disposed to a center of the card placement position, and the receiving units are disposed around the transmission unit. In another preferred embodiment, at least a second conducting electrode is disposed around the first conducting electrode of the ID card.

The spirit of the present invention is to use a electrical connection between the first conducting electrode and the second conducting electrode(s) to combine into different connection types. After the card is disposed on the card placement position, the card reader emits the wireless signal from the position of the first conducting electrode and determines the receiving unit(s) which receive(s) the transmission signal to determine the electrode connection between the first conducting electrode and the second conducting electrode(s). As such, the card reader can determine the ID code of the ID card. The sensing device, including the transmission unit and the receiving units, can be implemented by the electric field pulse wave transmitting and receiving devices or the electromagnetic induction devices. Since the electrical connection between the conducting electrodes in the card represents its ID, the cost of ID would be greatly reduced.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
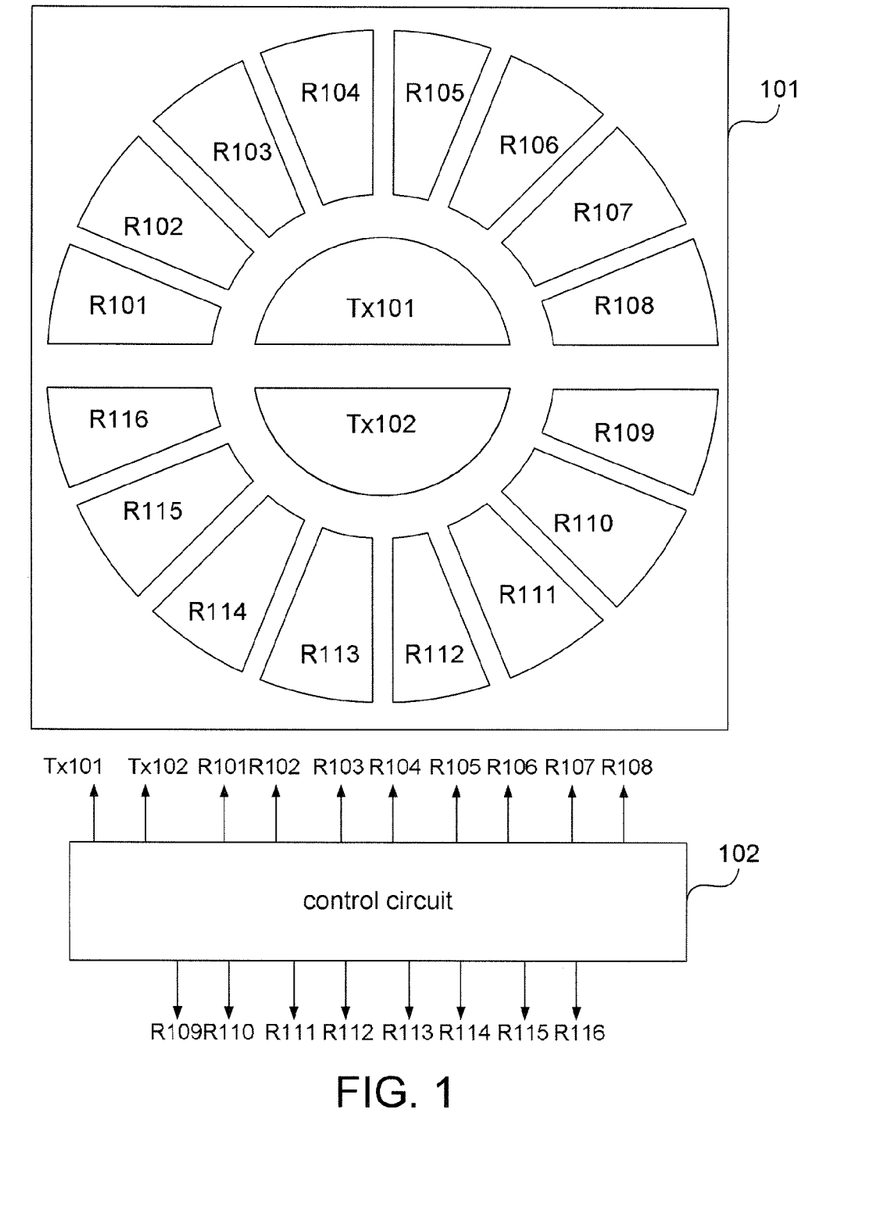
FIG. 1 illustrates a drawing depicting a card reader of a system for identifying ID according to a preferred embodiment of the present invention.

FIG. 1 illustrates a drawing depicting a card reader of a system for identifying ID according to a preferred embodiment of the present invention. Referring to FIG. 1, the card reader includes a card placement position 101, a control circuit 102, a first transmission unit Tx101, a second transmission unit Tx102, a first receiving unit R101, a second receiving unit R102, a third receiving unit R103, a fourth receiving unit R104, a fifth receiving unit R105, a sixth receiving unit R106, a seventh receiving unit R107, an eight receiving unit R108, a ninth receiving unit R109, a tenth receiving unit R110, an eleventh receiving unit R111, a twelfth receiving unit R112, a thirteenth receiving unit R113, a fourteenth receiving unit R114, a fifteenth receiving unit R115 and a sixteenth receiving unit R116. The control circuit 102 is coupled to the first transmission unit Tx101, the second transmission unit Tx102, the first receiving unit R101, the second receiving unit R102, the third receiving unit R103, the fourth receiving unit R104, the fifth receiving unit R105, the sixth receiving unit R106, the seventh receiving unit R107, the eight receiving unit R108, the ninth receiving unit R109, the tenth receiving unit R110, the eleventh receiving unit R111, the twelfth receiving unit R112, the thirteenth receiving unit R113, the fourteenth receiving unit R114, the fifteenth receiving unit R115 and the sixteenth receiving unit R116.

Figure 2A:
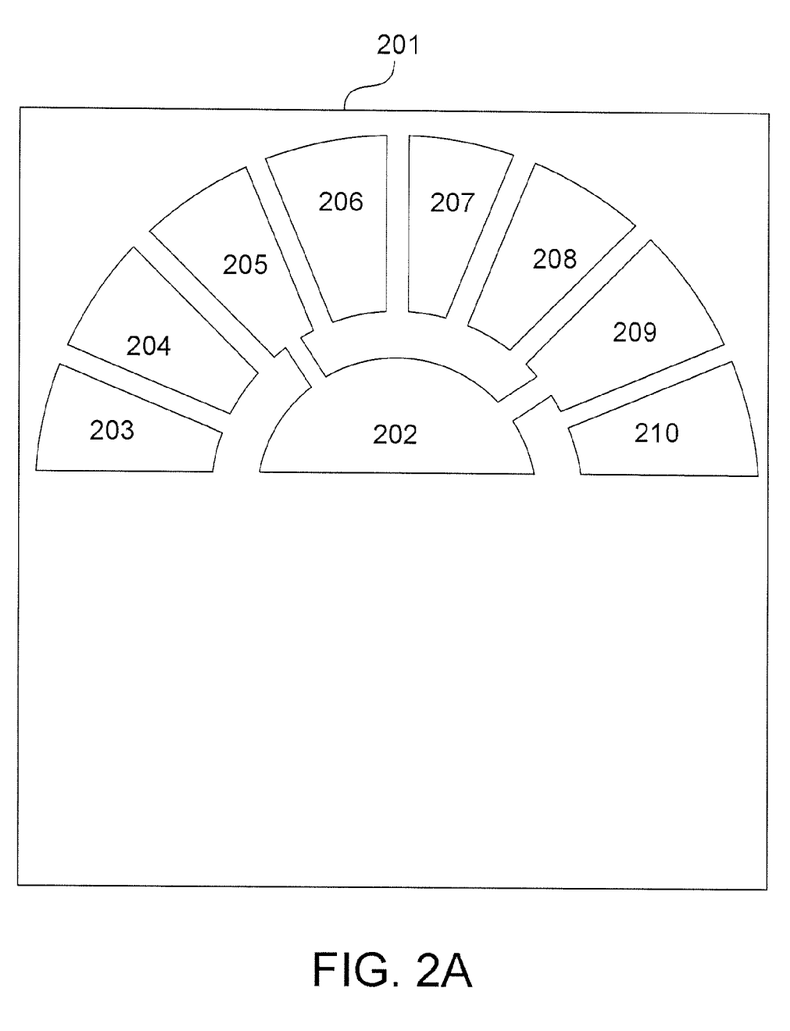
FIG. 2A illustrates a drawing depicting a master ID card with a specific ID in the system for identifying ID according to a preferred embodiment of the present invention.

FIG. 2A illustrates a drawing depicting a master ID card with a specific ID in the system for identifying ID according to a preferred embodiment of the present invention. Referring to FIG. 1 and FIG. 2A, the master ID card includes a card case 201, a first conducting electrode 202 and eight second conducting electrodes 203, 204, 205, 206, 207, 208, 209 and 210, wherein the master card is disposed on the card placement position 101 of the card reader in FIG. 1, the position of the first conducting electrode 202 is corresponding to the first transmission unit Tx101 and the positions of each of the second conducting electrodes 203, 204, 205, 206, 207, 208, 209 and 210 are corresponding to the positions of the first receiving unit R101, the second receiving unit R102, the third receiving unit R103, the fourth receiving unit R104, the fifth receiving unit R105, the sixth receiving unit R106, the seventh receiving unit R107 and the eight receiving unit R108.

In the present embodiment, the first conducting electrode 202 is electrically connected to the second conducting electrodes 205 and 209. Therefore, when the master ID card is disposed on the card placement position 101 of the card reader in FIG. 1, and the first transmission unit Tx101 transmits a wireless signal, the third receiving unit R103 and the seventh receiving unit R107 would respectively receive the wireless signal. As such, the control circuit 102 determines that the raw data of the master ID card is "00100010". Further, people having ordinary skill in the art should know that the maximum number of the master ID of the master ID card would be C(8, 0)+C(8, 1)+C(8, 2)+C(8, 3)+C(8, 4)+C(8, 5)+C(8, 6)+C(8, 7)+C(8, 8)=1+8+28+56+70+56+28+8+1=256 according to the electrical connection between the first conducting electrode 202 and the second conducting electrodes 203, 204, 205, 206, 207, 208, 209 and 210.

Moreover, the first conducting electrode 202 and each of the second conducting electrodes 203, 204, 205, 206, 207, 208, 209 and 210 are disposed at the upper side of the ID card. In addition, the card reader still includes the second transmission unit Tx102, the ninth receiving unit R109, the tenth receiving unit R110, the eleventh receiving unit R111, the twelfth receiving unit R112, the thirteenth receiving unit R113, the fourteenth receiving unit R114, the fifteenth receiving unit R115 and the sixteenth receiving unit R116 which is disposed at the lower side of the card placement position 101. Those units are for identifying a slave ID card.

Figure 2B:
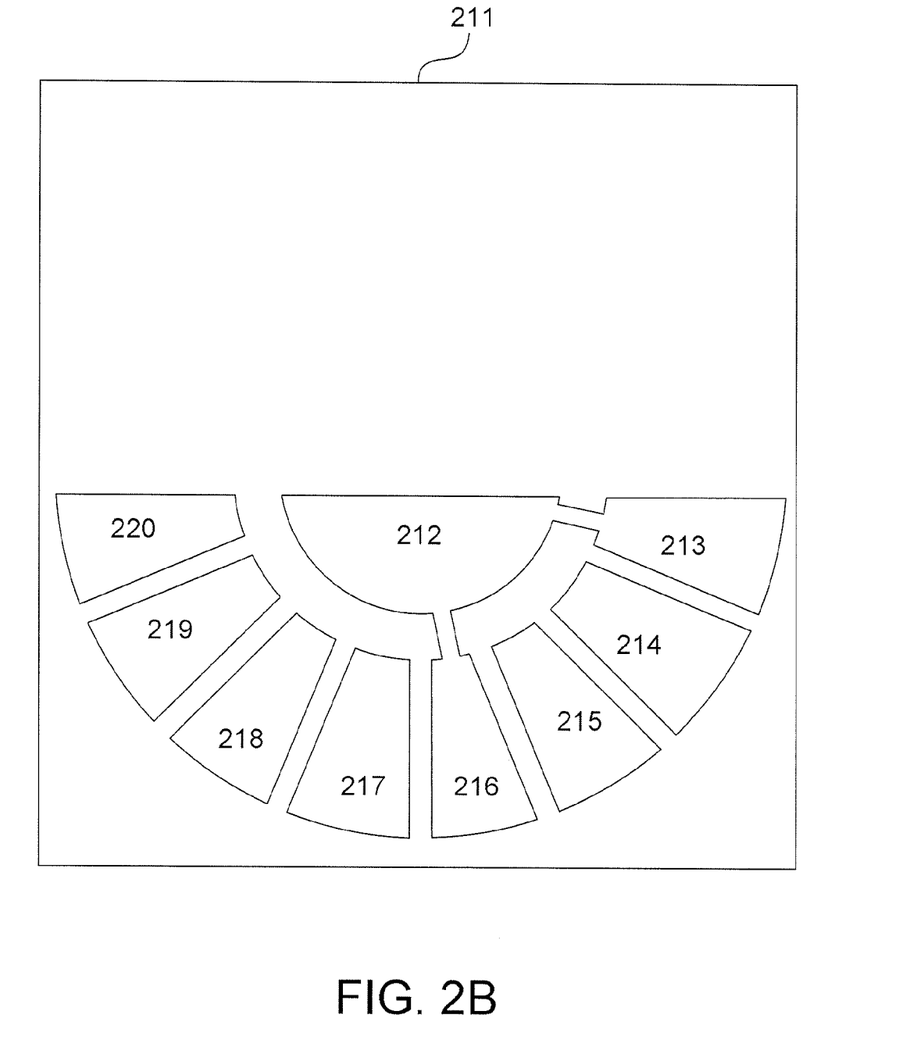
FIG. 2B illustrates a drawing depicting a slave ID card with a specific ID in the system for identifying ID according to a preferred embodiment of the present invention.

FIG. 2B illustrates a drawing depicting a slave ID card with a specific ID in the system for identifying ID according to a preferred embodiment of the present invention. Referring to FIG. 1 and FIG. 2B, the slave ID card includes a card case 211, a third conducting electrode 212 and eight fourth conducting electrodes 213, 214, 215, 216, 217, 218, 219 and 220, wherein the position of the third conducting electrode 212 is corresponding to the second transmission unit Tx102 and each of the fourth conducting electrodes 213, 214, 215, 216, 217, 218, 219 and 220 are corresponding to the positions of the ninth receiving unit R109, the tenth receiving unit R110, the eleventh receiving unit R111, the twelfth receiving unit R112, the thirteenth receiving unit R113, the fourteenth receiving unit R114, the fifteenth receiving unit R115 and the sixteenth receiving unit R116 when the slave ID card is disposed on the card placement position 101 of the card reader.

In the present embodiment, the third conducting electrode 212 is electrically connected to the fourth conducting electrodes 213 and 216. Therefore, when the slave ID card is disposed on the card placement position 101 of the card reader in FIG. 1 and the second transmission unit Tx102 transmits a wireless signal, the ninth receiving unit R109 and the twelfth receiving unit R112 would respectively receive the wireless signal. As such, the control circuit 102 determines that the raw data of the slave ID card is "10010000". In addition, people having ordinary skill in the art should know that the maximum number of the slave ID of the slave ID card would be C(8, 0)+C(8, 1)+C(8, 2)+C(8, 3)+C(8, 4)+C(8, 5)+C(8, 6)+C(8, 7)+C(8, 8)=1+8+28+56+70+56+28+8+1=256 according to the electrical connection between the third conducting electrode 212 and the fourth conducting electrodes 213, 214, 215, 216, 217, 218, 219 and 220.

According to the master ID card and the slave ID card of the abovementioned embodiment, many of application for the ID card can be implemented, such as electrical card game. It is assumed that one master ID card represents Thor, the other master ID card represents Loki. Further, it is assumed that one slave ID card represents Mjolnir, the other slave card represents Chitauri Scepter. When the Thor card is disposed on the card placement position 101 of the card reader of a game console (or an arcade game machine), the game console (or the arcade game machine) would identify that the card on the card placement position 101 represents Thor. Moreover, if the Mjolnir card is placed on the Thor card on the card placement position 101, the game console (or the arcade game machine) would identify that the Thor card and the Mjolnir card are paring cards, and the game console (or the arcade game machine) would show "power up". However, if the Chitauri Scepter card is placed on the Thor card on the card placement position 101, the game console (or the arcade game machine) would identify that the Thor card and the Chitauri Scepter card are not paring cards, and the game console (or the arcade game machine) would not show "power up". However, if the Chitauri Scepter card is placed on the Loki card on the card placement position 101, the game console (or the arcade game machine) would identify that the Loki card and the Chitauri Scepter card are paring cards, and the game console (or the arcade game machine) would show "power up".

In the embodiment in FIGS. 2A and 2B, every positions of the second conducting electrodes and the fourth conducting electrodes have conductors. People having ordinary skill in the art should know that the positions of the second conducting electrodes 203, 204, 206, 207, 208, 210 can have no conductor, and the positions of the fourth conducting electrodes 214, 215, 217, 218, 219, 220 also can have no conductor. In other words, if the implementation of the ID card in FIG. 2A or FIG. 2B is changed to a slot type, such as to change the positions of the second conducting electrodes 203~210 as slots, the positions of the second conducting electrodes 203, 204, 206, 207, 208, 210 can be without disposition of any conductor. Similarly, if the positions of the second conducting electrodes 211~220 is changed as slots, the positions of the fourth conducting electrodes 214, 215, 217, 218, 219, 220 can be without disposition of any conductor.

In the abovementioned embodiment, the card reader can be used for identifying the master/slave cards. In the following embodiment, a rotatable circular ID card is adopted to describe the present invention.

Figure 3:
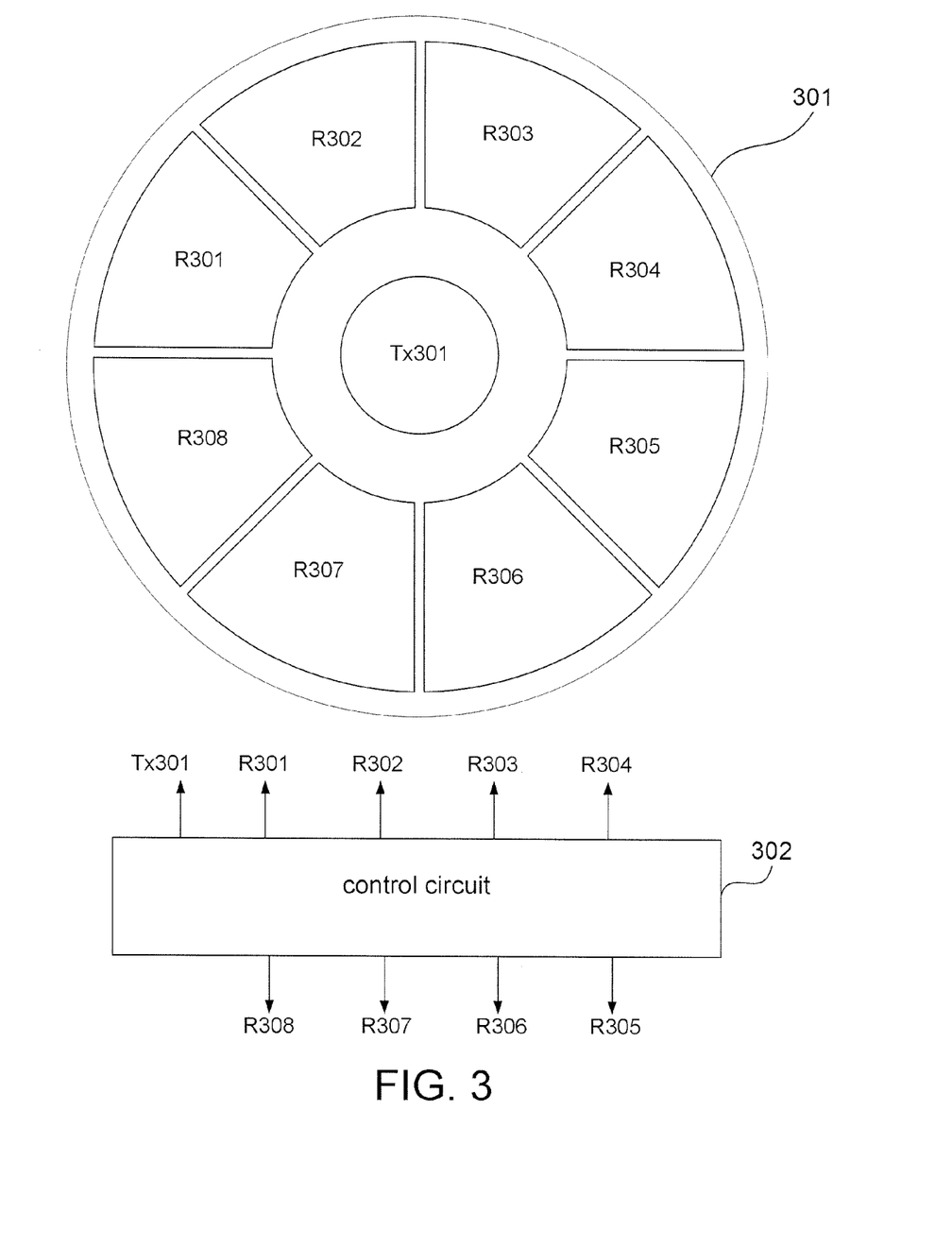
FIG. 3 illustrates a drawing depicting a card reader of a system for identifying ID according to a preferred embodiment of the present invention.

FIG. 3 illustrates a drawing depicting a card reader of a system for identifying ID according to a preferred embodiment of the present invention. Referring to FIG. 3, the card reader includes a card placement position 301, a control circuit 302, a transmission unit Tx301, a first receiving unit R301, a second receiving unit R302, a third receiving unit R303, a fourth receiving unit R304, a fifth receiving unit R305, a sixth receiving unit R306, a seventh receiving unit R307 and an eight receiving unit R308. The control circuit is coupled to the transmission unit Tx301, the first receiving unit R301, the second receiving unit R302, the third receiving unit R303, the fourth receiving unit R304, the fifth receiving unit R305, the sixth receiving unit R306, the seventh receiving unit R307 and the eight receiving unit R308.

Figure 4:
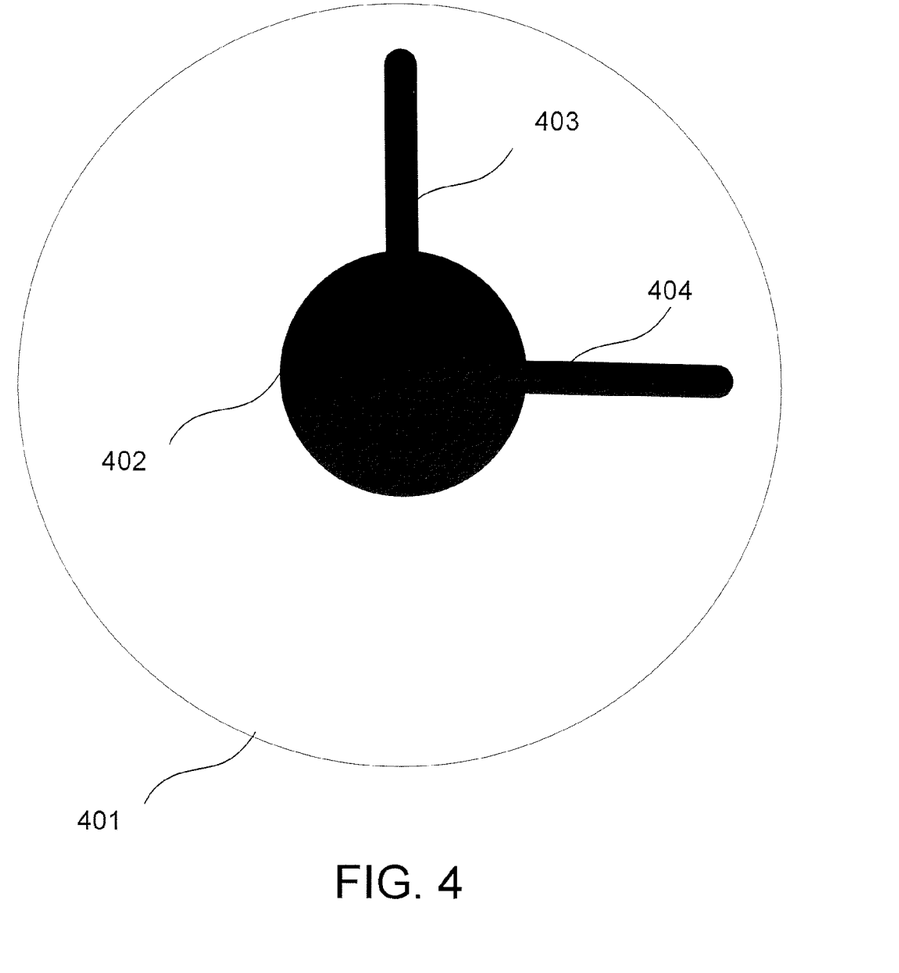
FIG. 4 illustrates a drawing depicting an ID card with a specific ID in the system for identifying ID according to a preferred embodiment of the present invention.

FIG. 4 illustrates a drawing depicting an ID card with a specific ID in the system for identifying ID according to a preferred embodiment of the present invention. Referring to FIG. 3 and FIG. 4, the ID card includes a card case 401, a first conducting electrode 402 and two second conducting electrodes 403 and 404, wherein, when the ID card is disposed on the card placement position 301, the position of the first conducting electrode 402 is corresponding to the transmission unit Tx301, and the positions of the second conducting electrodes 403 and 404 are corresponding to the first receiving unit R301, the second receiving unit R302, the third receiving unit R303, the fourth receiving unit R304, the fifth receiving unit R305, the sixth receiving unit R306, the seventh receiving unit R307 and the eight receiving unit R308.

Figure 5A:
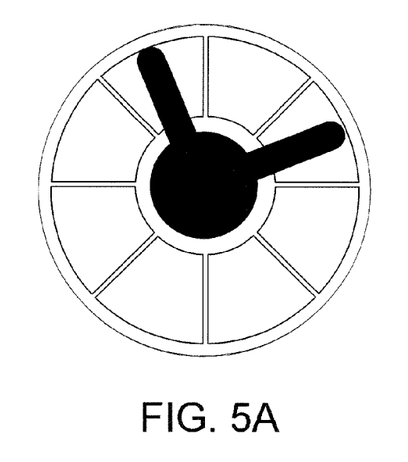
FIG. 5A illustrates a drawing depicting a card reader reading a raw data of an ID card according to a preferred embodiment of the present invention.

Since the shape of the ID card is circular shape, the raw data read by the control circuit is changeable according to the disposition angle of the ID card when the ID card is disposed on the card placement position 301 of the card reader in FIG. 3. FIG. 5A illustrates a drawing depicting a card reader reading a raw data of an ID card according to a preferred embodiment of the present invention. Referring to FIG. 5A, when the ID card in FIG. 4 is disposed on the card reader in FIG. 3, and its rotation angle is 22.5 degree, the raw data read by the control circuit is "01010000" since the positions of the second conducting electrodes 403 and 404 are respectively on the position of the second receiving unit R302 and the position of the fourth receiving unit R304.

Figure 5B:
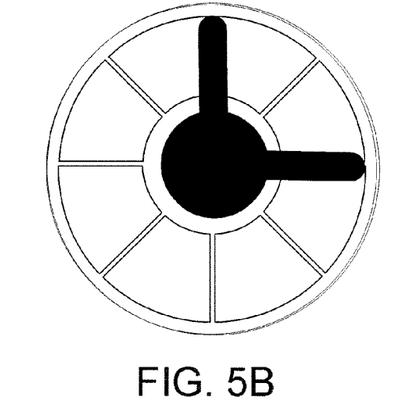
FIG. 5B illustrates a drawing depicting a card reader reading a raw data of an ID card according to a preferred embodiment of the present invention.

FIG. 5B illustrates a drawing depicting a card reader reading a raw data of an ID card according to a preferred embodiment of the present invention. Referring to FIG. 5B, when the ID card in FIG. 4 is disposed on the card reader in FIG. 3, and its rotation angle is 0 degree, the raw data read by the control circuit is "01111000" since the position of the second conducting electrode 403 is on the position between the second receiving unit R302 and the third receiving unit R303 and the position of the second conducting electrode 404 is on the position between the fourth receiving unit R304 and the fifth receiving unit R305.

Figure 5C:
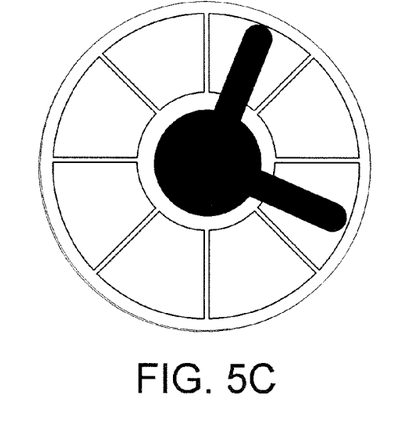
FIG. 5C illustrates a drawing depicting a card reader reading a raw data of an ID card according to a preferred embodiment of the present invention.

FIG. 5C illustrates a drawing depicting a card reader reading a raw data of an ID card according to a preferred embodiment of the present invention. Referring to FIG. 5C, when the ID card in FIG. 4 is disposed on the card reader in FIG. 3, and its rotation angle is −22.5 degree, the raw data read by the control circuit is "00101000" since the position of the second conducting electrode 403 is on the position of the third receiving unit R303 and the position of the second conducting electrode 404 is on the position of the fifth receiving unit R305.

According to the embodiments in FIG. 5A, FIG. 5B and FIG. 5C, even though the read raw data are different, the angle between the second conducting electrodes 403 and 404 is constant. Thus, the control circuit 302 can determine the ID of the ID card according to the number of logic "0" between two logic "1" even if the read raw data are different. Further, if the system for identifying ID is adopted by a game console (or an arcade game machine), the system is not only for identifying ID but for measuring the rotation angle and rotation speed.

Similarly, the rotatable circular ID card also can be further used for a more advanced application, such as clock teaching.

Figure 6:
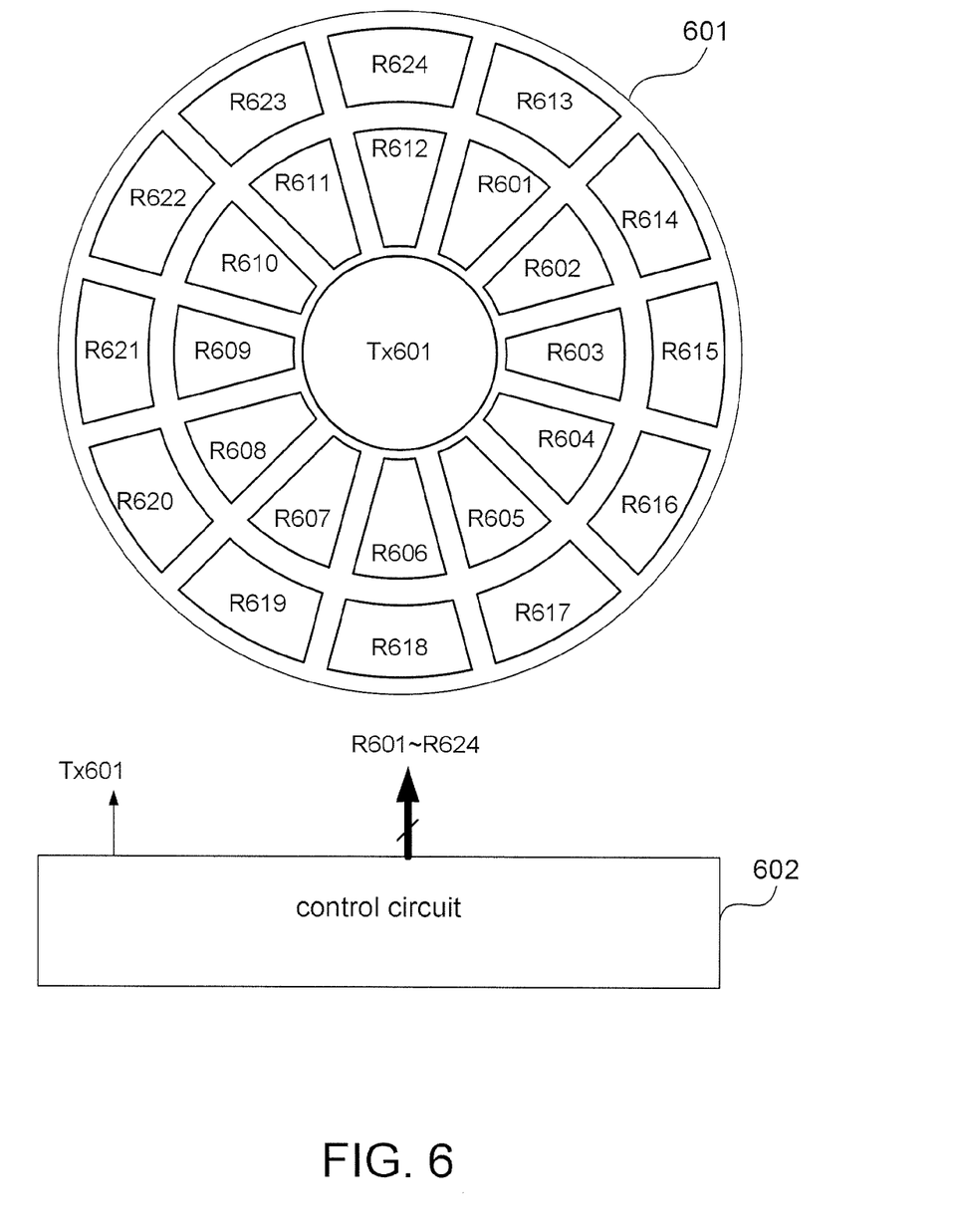
FIG. 6 illustrates a drawing depicting a card reader of a system for identifying ID according to a preferred embodiment of the present invention.

FIG. 6 illustrates a drawing depicting a card reader of a system for identifying ID according to a preferred embodiment of the present invention. Referring to FIG. 6, the card reader includes a card placement position 601, a control circuit 602, a transmission unit Tx601, a first receiving unit R601, a second receiving unit R602, a third receiving unit R603, a fourth receiving unit R604, a fifth receiving unit R605, a sixth receiving unit R606, a seventh receiving unit R607, an eight receiving unit R608, a ninth receiving unit R609, a tenth receiving unit R610, an eleventh receiving unit R611, a twelfth receiving unit R612, a thirteenth receiving unit R613, a fourteenth receiving unit R614, a fifteenth receiving unit R615, a sixteenth receiving unit R616, a seventeenth receiving unit R617, an eighteenth receiving unit R618, a nineteenth receiving unit R619, a twentieth receiving unit R620, a twenty first receiving unit R621, a twenty second receiving unit R622, a twenty third receiving unit R623 and a twenty fourth receiving unit R624. The control circuit 602 is coupled to the transmission unit Tx601, the first receiving unit R601, the second receiving unit R602, the third receiving unit R603, the fourth receiving unit R604, the fifth receiving unit R605, the sixth receiving unit R606, the seventh receiving unit R607, the eight receiving unit R608, the ninth receiving unit R609, the tenth receiving unit R610, the eleventh receiving unit R611, the twelfth receiving unit R612, the thirteenth receiving unit R613, the fourteenth receiving unit R614, the fifteenth receiving unit R615, the sixteenth receiving unit R616, the seventeenth receiving unit R617, the eighteenth receiving unit R618, the nineteenth receiving unit R619, the twentieth receiving unit R620, the twenty first receiving unit R621, the twenty second receiving unit R622, the twenty third receiving unit R623 and the twenty fourth receiving unit R624.

Figure 7A:
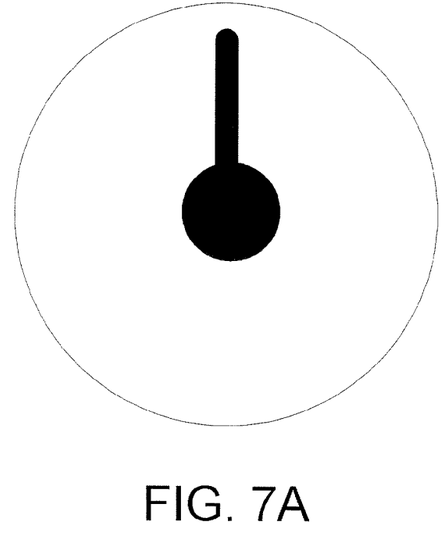
FIG. 7A illustrates a drawing depicting an ID card with a specific ID in the system for identifying ID according to a preferred embodiment of the present invention.
Figure 7B:
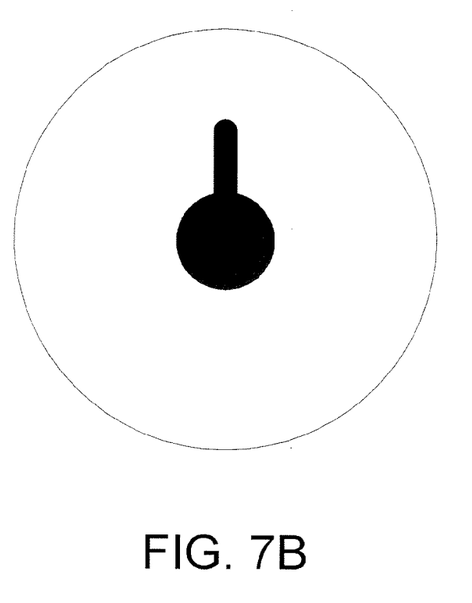
FIG. 7B illustrates a drawing depicting an ID card with a specific ID in the system for identifying ID according to a preferred embodiment of the present invention.

FIG. 7A illustrates a drawing depicting an ID card with a specific ID in the system for identifying ID according to a preferred embodiment of the present invention. FIG. 7B illustrates a drawing depicting an ID card with a specific ID in the system for identifying ID according to a preferred embodiment of the present invention. Referring to FIG. 6, FIG. 7A and FIG. 7B, in the present embodiment, the ID card in FIG. 7A represents the minute hand of the clock, and the ID card in FIG. 7B represents the hour hand of the clock.

Figure 8A:
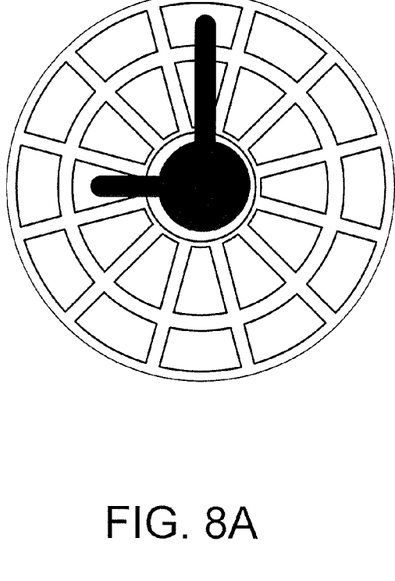
FIG. 8A illustrates a drawing depicting a card reader reading a raw data of an ID card according to a preferred embodiment of the present invention.

FIG. 8A illustrates a drawing depicting a card reader reading a raw data of an ID card according to a preferred embodiment of the present invention. Referring to FIG. 8A, when the hour hand ID card and the minute hand ID card are disposed on the card placement position 601 of the card reader in FIG. 6 as shown in FIG. 8A, the control circuit 602 would read the raw data "000000001001000000000001". As such, the control circuit 602 would determine that the time represented by the hour hand ID card and the minute hand ID card is nine o'clock.

Figure 8B:
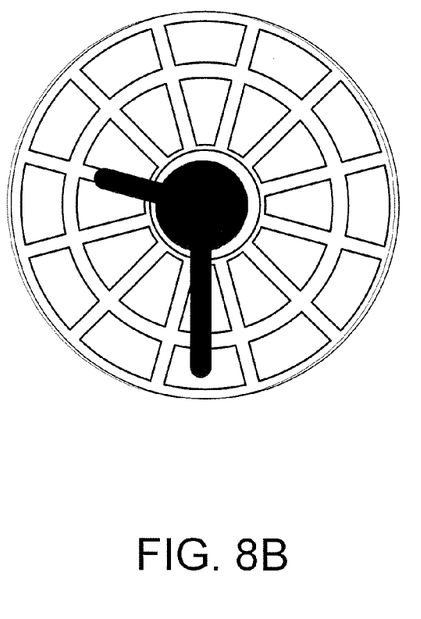
FIG. 8B illustrates a drawing depicting a card reader reading a raw data of an ID card according to a preferred embodiment of the present invention.

FIG. 8B illustrates a drawing depicting a card reader reading a raw data of an ID card according to a preferred embodiment of the present invention. Referring to FIG. 8B, when the hour hand ID card and the minute hand ID card are disposed on the card placement position 601 of the card reader in FIG. 6 as shown in FIG. 8B, the control circuit 602 would read the raw data "000001001100000001000000". As such, the control circuit 602 would determine that the time represented by the hour hand ID card and the minute hand ID card is nine thirty.

In the abovementioned embodiment, the clock teaching is adopted as an exemplary example. In the following embodiment, a position identification, a sliding direction identification and a speed identification is provided.

Figure 9:
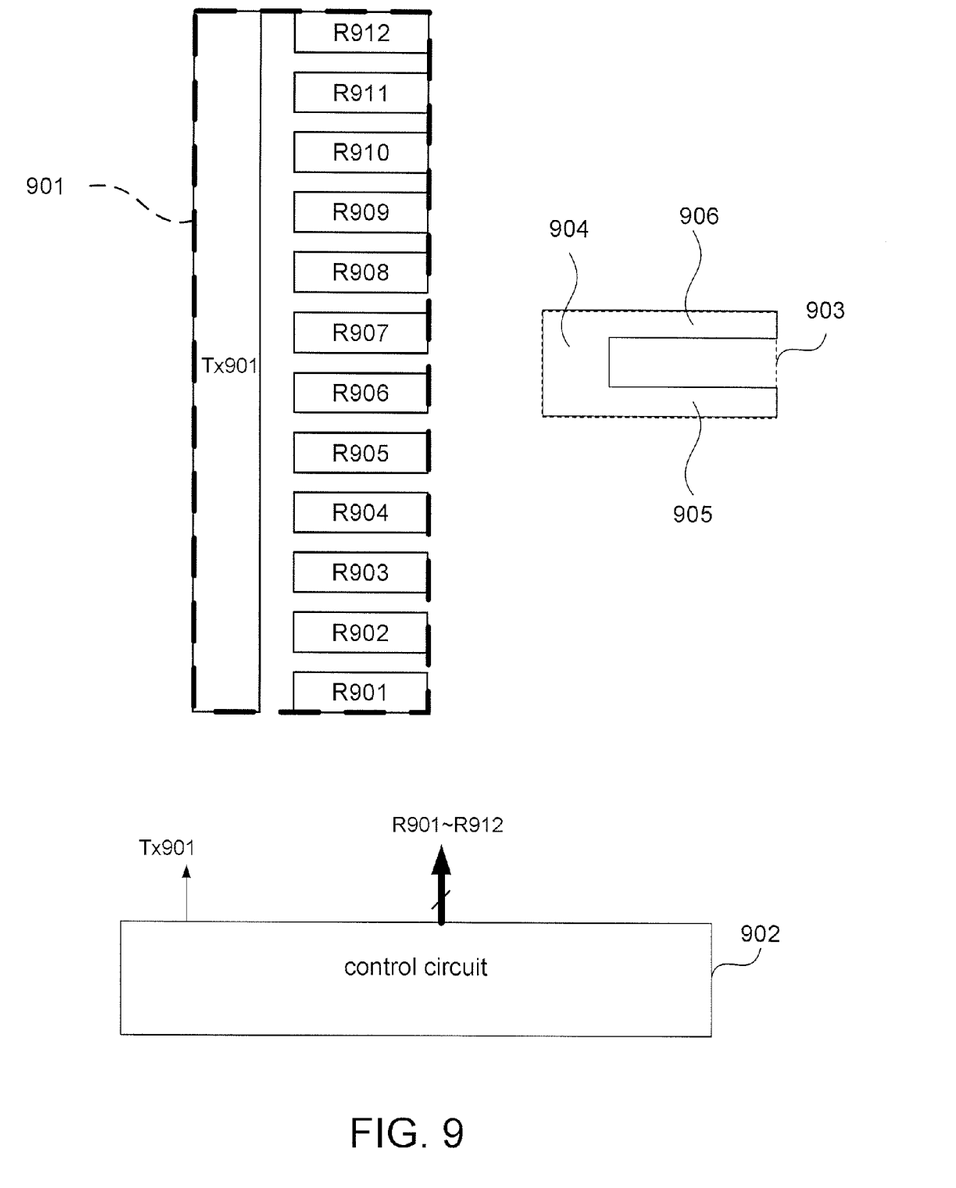
FIG. 9 illustrates a drawing depicting an ID card with a specific ID in the system for identifying ID according to a preferred embodiment of the present invention.

FIG. 9 illustrates a drawing depicting an ID card with a specific ID in the system for identifying ID according to a preferred embodiment of the present invention. Referring to FIG. 9, the system for identifying ID includes a card reader and at least an ID card. The card reader includes a card placement position 901, a control circuit 902, a transmission unit Tx901, a first receiving unit R901, a second receiving unit R902, a third receiving unit R903, a fourth receiving unit R904, a fifth receiving unit R905, a sixth receiving unit R906, a seventh receiving unit R907, an eight receiving unit R908, a ninth receiving unit R909, a tenth receiving unit R910, an eleventh receiving unit R911 and a twelfth receiving unit R912. The ID card includes a card case 903, a first conducting electrode 904, a second conducting electrodes 905 and 906.

Figure 10:
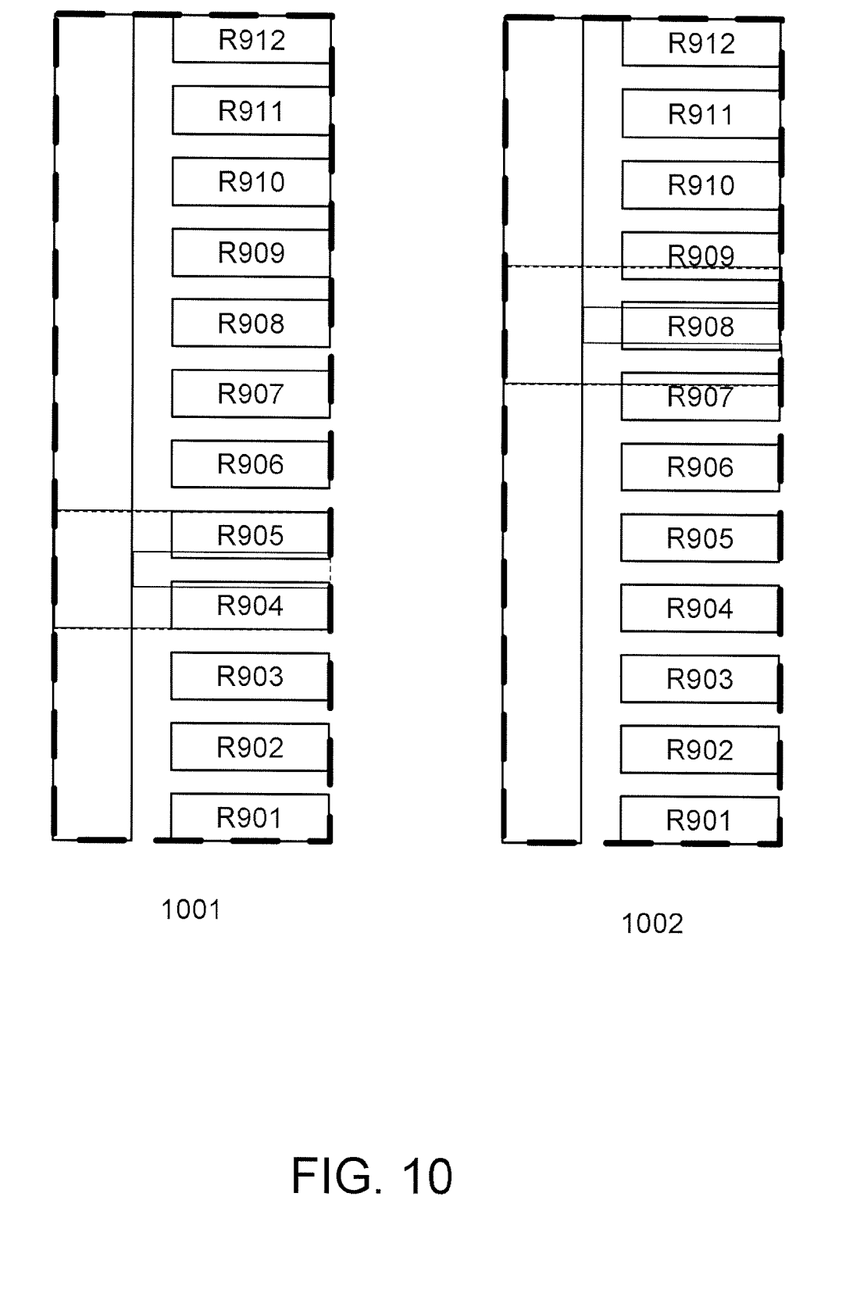
FIG. 10 illustrates a drawing depicting a card reader reading a raw data of an ID card according to a preferred embodiment of the present invention.

Since the shape of the card placement position 901 is a rail shape, and the shape of the ID card is rectangular, when the ID card is disposed on the card placement position 901 of the card reader, the raw data read by the control circuit 902 is changeable according to the position of the ID card. FIG. 10 illustrates a drawing depicting a card reader reading a raw data of an ID card according to a preferred embodiment of the present invention. Referring to FIG. 10, the situation 1001 illustrates that the ID card is disposed on the card placement position 901 and the second conducting electrodes 905 and 906 are respectively disposed on the fourth receiving unit R904 and the fifth receiving unit R905. At this situation 1001, the raw data read by the control circuit 902 is "000110000000". The situation 1002 illustrates that the ID card is disposed on the card placement position 901 and the second conducting electrodes 905 and 906 are disposed on the seventh receiving unit R907, the eighth receiving unit R908 and the ninth receiving unit R909. At this situation 1002, the raw data read by the control circuit 902 is "000000111000".

According to the abovementioned embodiment, when the ID card is slid on the rail type card placement position 901, the read ID code would be changed according to the position of the ID card. As such, the control circuit 902 can be not only for identifying the ID of the ID card, but also for control circuit 902 can be for identifying the speed of the ID card, the position of the ID card and the moving direction of the ID card.

In summary, the spirit of the present invention is to use a electrical connection between the first conducting electrode and the second conducting electrode(s) to combine into different connection style. After the card is disposed on the card placement position, the card reader emits the wireless signal from the position of the first conducting electrode and determines the receiving unit(s) which receive(s) the transmission signal to determine the electrode connection between the first conducting electrode and the second conducting electrode(s). As such, the card reader can determine the ID code of the ID card. The sensing device, including the transmission unit and the receiving units, can be implemented by the electric field pulse wave transmitting and receiving devices or the electromagnetic induction devices. Since the electrical connection between the conducting electrodes in the card represents its ID, the cost of ID would be greatly reduced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An ID card, identifying by a card reader,
wherein the card reader comprises:
a card placement position;
a transmission unit, for outputting a transmission signal;
a plurality of receiving units, for receiving the transmission signal; and
a control circuit, coupled to the transmission unit and the plurality of receiving units, for controlling the transmission unit to output the transmission signal and determining an ID code according to receiving unit(s) which receives the transmission signal;
wherein the ID card comprises:
a first card case;
a first conducting electrode, disposed in the first card case, wherein the first conducting electrode is disposed on a position corresponding to the transmission unit when the ID card is disposed on the card placement position of the card reader; and
at least a second conducting electrode, disposed in the first card case, wherein at least a second conducting electrode is electrically connected to the first conducting electrode to represent a specific ID, wherein at least a second conducting electrode is disposed on a position corresponding to one of the receiving units when the ID card is disposed on the card placement position of the card reader;
wherein the transmission unit transmits the transmission signal when the ID card is close to the card reader, and the control circuit determines a specific ID code of the ID card according to receiving unit(s) which receives the transmission signal,
wherein the first conducting electrode is disposed on a first side of the first card case, and the second conducting electrode(s) is/are disposed on the first side of the first card case,
wherein the card reader further comprises:
a second transmission unit, coupled to the control circuit, for outputting a second transmission signal; and
a plurality of second receiving units, coupled to the control circuit, for receiving the second transmission signal;

wherein a slave ID card comprises:
a second card case;
a third conducting electrode, disposed in the second card case and disposed to a second side of the second card case, wherein the third conducting electrode is disposed on a position corresponding to the second transmission unit when the slave ID card is disposed on the card placement position; and
at least a fourth conducting electrode, disposed in the second card case and disposed to the second side of the second card case, wherein at least a fourth conducting electrode is electrically connected to the third conducting electrode to represent a specific slave ID, wherein at least a fourth conducting electrode is disposed on a position corresponding to one of the receiving units when the slave ID card is disposed on the card placement position of the card reader,
wherein the card placement position is divided into a first side and a second side, wherein the transmission unit and the plurality of receiving units are disposed on the first side of the card placement position corresponding to the first side of the first card case,
wherein the second transmission unit and the plurality of second receiving units is disposed on the second side of the card placement position corresponding to the second side of the second card case.

2. The ID card according to claim 1, wherein the ID card is a circle ID card, and the first conducting electrode is disposed to a center of the ID card, wherein the transmission unit is disposed to a center of the card placement position, and the receiving units are disposed around the transmission unit.

3. The ID card according to claim 2, wherein at least a second conducting electrode is disposed around the first conducting electrode of the ID card.

4. A system for identifying ID, comprising:
a card reader, for identifying an ID, wherein the card reader comprises:
a card placement position;
a transmission unit, for outputting a transmission signal;
a plurality of receiving units, for receiving the transmission signal; and
a control circuit, coupled to the transmission unit and the receiving units, for controlling the transmission unit to output the transmission signal and determining an ID code according to receiving unit(s) which receives the transmission signal;
at least an ID card, each ID card comprising:
a first card case;
a first conducting electrode, disposed in the first card case, wherein the first conducting electrode is disposed on a position corresponding to the transmission unit when the ID card is disposed on the card placement position of the card reader; and
at least a second conducting electrode, disposed in the first card case, wherein at least a second conducting electrode is electrically connected to the first conducting electrode to represent a specific ID, wherein at least a second conducting electrode is disposed on a position corresponding to one of the receiving units when the ID card is disposed on the card placement position of the card reader;
wherein the transmission unit transmits the transmission signal when the ID card is close to the card reader, and the control circuit determines a specific ID code of the ID card according to receiving unit(s) which receives the transmission signal, wherein the first conducting electrode is disposed on a first side of the first card case, and the second conducting electrode(s) is/are disposed on the first side of the first card case,
wherein the card reader further comprises:
a second transmission unit, coupled to the control circuit, for outputting a second transmission signal; and
a plurality of second receiving units, coupled to the control circuit, for receiving the second transmission signal;
wherein a slave ID card comprises:
a second card case;
a third conducting electrode, disposed in the second card case and disposed to a second side of the second card case, wherein the third conducting electrode is disposed on a position corresponding to the second transmission unit when the slave ID card is disposed on the card placement position; and
at least a fourth conducting electrode, disposed in the second card case and disposed to the second side of the second card case, wherein at least a fourth conducting electrode is electrically connected to the third conducting electrode to represent a specific slave ID, wherein at least a fourth conducting electrode is disposed on a position corresponding to one of the receiving units when the slave ID card is disposed on the card placement position of the card reader,
wherein the card placement position is divided into a first side and a second side,
wherein the transmission unit and the plurality of receiving units are disposed on the first side of the card placement position corresponding to the first side of the first card case,
wherein the second transmission unit and the plurality of second receiving units is disposed on the second side of the card placement position corresponding to the second side of the second card case.

5. The system according to claim 4, wherein the ID card is a circle ID card, and the first conducting electrode is disposed to a center of the ID card, wherein the transmission unit is disposed to a center of the card placement position, and the receiving units are disposed around the transmission unit.

6. The system according to claim 5, wherein at least a second conducting electrode is disposed around the first conducting electrode of the ID card.

7. A system for identifying ID, comprising:
a card reader, for identifying an ID, wherein the card reader comprises:
a card placement position;
a transmission unit, for outputting a transmission signal;
a plurality of receiving units, for receiving the transmission signal; and
a control circuit, coupled to the transmission unit and the receiving units, for controlling the transmission unit to output the transmission signal and determining an ID code according to receiving unit(s) which receives the transmission signal;
at least an ID card, each ID card comprising:
a first card case;
a first conducting electrode, disposed in the first card case, wherein the first conducting electrode is disposed on a position corresponding to the transmission unit when the ID card is disposed on the card placement position of the card reader; and
a plurality of electrode fixed positions, disposed in the first card case, for disposing at least a second conducting electrode, wherein at least a specific second conducting electrode is electrically connected to the first conducting electrode to represent a specific ID, wherein the plurality of electrode fixed positions are disposed on the positions corresponding to the receiving units when the ID card is disposed on the card placement position of the card reader;

wherein the transmission unit transmits the transmission signal when the ID card is close to the card reader, and the control circuit determines a specific ID code of the ID card according to receiving unit(s) which receives the transmission signal, wherein the first conducting electrode is disposed on a first side of the first card case, and the electrode fixed position(s) is/are disposed on the first side of the first card case, wherein the card reader further comprises:

a second transmission unit, coupled to the control circuit, for outputting a second transmission signal; and a plurality of second receiving units, coupled to the control circuit, for receiving the second transmission signal;

wherein a slave ID card comprises:

a second card case;

a third conducting electrode, disposed in the second card case and disposed to a second side of the second card case; and a plurality of second electrode fixed positions, disposed on and arranged in the second card case, and disposed on the second side of the second card case, for disposing at least a fourth conducting electrode, wherein at least a fourth conducting electrode is electrically connected to the third conducting electrode to represent a specific slave ID, wherein the third conducting electrode is disposed on a position corresponding to the second transmission unit when the slave ID card is disposed on the card placement position, wherein the second electrode fixed positions are disposed on the positions corresponding to the second receiving units when the ID card is placed on the card placement position of the card reader, wherein the card placement position is divided into a first side and a second side, wherein the transmission unit and the plurality of receiving units are disposed on the first side of the card placement position corresponding to the first side of the first card case, wherein the second transmission unit and the plurality of second receiving units is disposed on the second side of the card placement position corresponding to the second side of the second card case.

8. The system according to claim 7, wherein the ID card is a circle ID card, and the first conducting electrode is disposed to a center of the ID card, wherein the transmission unit is disposed to a center of the card placement position, and the receiving units are disposed around the transmission unit.

9. The system according to claim 8, wherein the electrode fixed positions are disposed around the first conducting electrode of the ID card.

* * * * *